(12) United States Patent
Leum

(10) Patent No.: US 7,670,096 B2
(45) Date of Patent: Mar. 2, 2010

(54) COMPOUND TRUCK LEVELER

(76) Inventor: Grant Leum, 2210 Sommergate, Excelsior, MN (US) 55331

( * ) Notice: Subject to any disclaimer, the term of this patent is extended or adjusted under 35 U.S.C. 154(b) by 122 days.

(21) Appl. No.: 11/343,408

(22) Filed: Jan. 31, 2006

(65) Prior Publication Data

US 2006/0245869 A1 Nov. 2, 2006

Related U.S. Application Data

(60) Provisional application No. 60/672,293, filed on Apr. 18, 2005.

(51) Int. Cl.
*E01D 1/00* (2006.01)

(52) U.S. Cl. .................. 414/401; 14/71.1; 14/71.7; 254/88

(58) Field of Classification Search .............. 414/401; 14/71.7, 71.1; 254/88
See application file for complete search history.

(56) References Cited

U.S. PATENT DOCUMENTS

| | | | | |
|---|---|---|---|---|
| 1,819,450 A | * | 8/1931 | Weller | ............... 254/88 |
| 4,348,780 A | * | 9/1982 | Angelo et al. | ............ 14/69.5 |
| 4,624,446 A | | 11/1986 | Gould | |
| 4,765,792 A | | 8/1988 | Cherry et al. | |
| 4,972,539 A | * | 11/1990 | Reiter | ............ 14/2.4 |
| 5,106,246 A | * | 4/1992 | Chance | ............ 410/26 |
| 6,368,043 B1 | | 4/2002 | Leum et al. | |
| 7,062,814 B2 | * | 6/2006 | Bender et al. | ......... 14/71.3 |

OTHER PUBLICATIONS

Attached definition from answers.com.*

* cited by examiner

*Primary Examiner*—Michael S Lowe
(74) *Attorney, Agent, or Firm*—Jansson Shupe & Munger Ltd.

(57) ABSTRACT

A compound truck leveler for use upon a driveway abutting a loading dock is provided that includes an incline portion having a trailing edge disposed further from the driveway than its leading edges, and a decline portion having a leading edge rigidly attached to the trailing edge of the incline portion and disposed further from the driveway than its trailing edge. The leveler is pivotally attached to a pivot apparatus rigidly attached to the driveway adjacent to the front of the leveler wherein the leveler is limited only to rotational movement about the pivot apparatus between lowered and raised positions. Preferably, the leveler also includes an extension portion extending towards the loading dock and rigidly attached to the decline portion wherein the extension is substantially parallel with the driveway in the lowered position. The pivot point of the leveler is preferably disposed further from the driveway than the rear of the leveler.

11 Claims, 4 Drawing Sheets

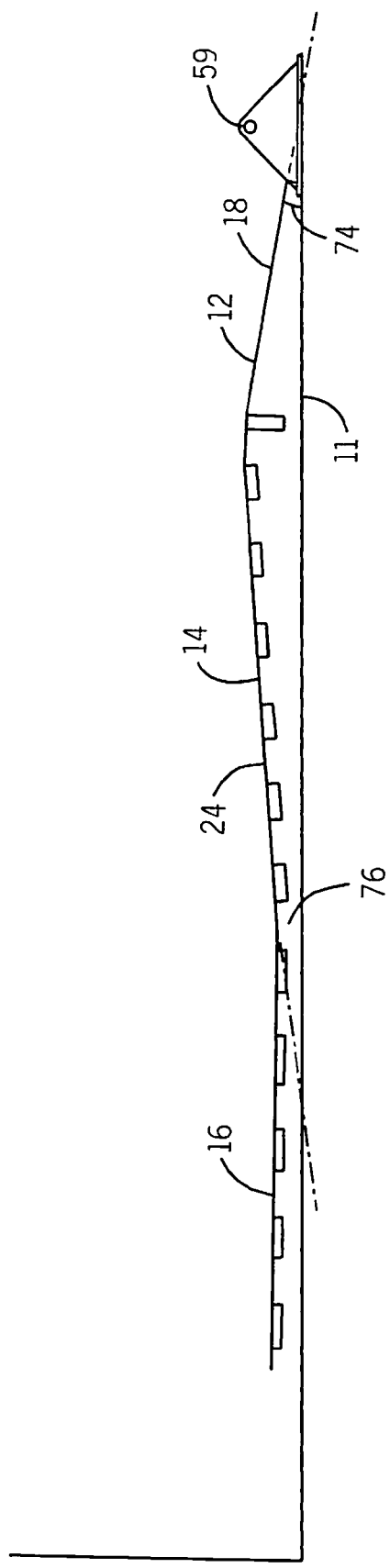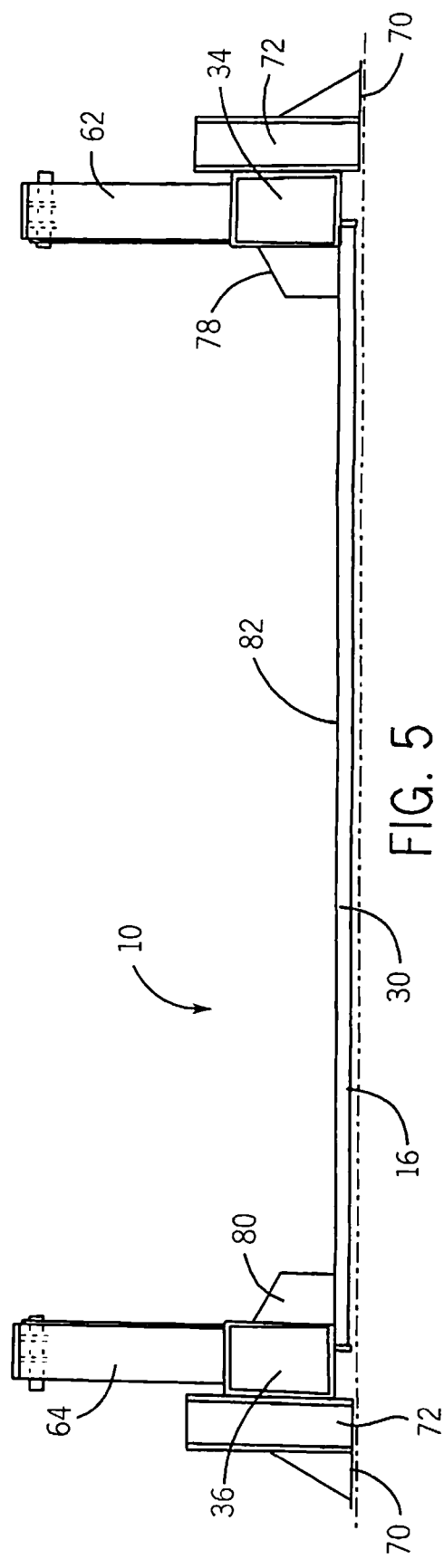

US 7,670,096 B2

COMPOUND TRUCK LEVELER

RELATED APPLICATION

This application is based on U.S. Provisional Application No. 60/672,293, filed Apr. 18, 2005, the contents of which are incorporated herein by reference.

FIELD OF THE INVENTION

This invention relates to truck levelers and more particularly to a truck leveler having multiple surface angles.

BACKGROUND OF THE INVENTION

A variety of truck levelers have been devised to adjust the height of different trailers to properly match the deck of the trailer to the height of the dock. By aligning the height of the trailer and the dock the loading and unloading of cargo is facilitated.

One such device is seen in U.S. Pat. No. 4,624,446 to Gould which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock.

A similar device is disclosed in U.S. Pat. No. 4,765,792 to Cherry et al. which also discloses a pivotally-mounted and hydraulically-raised platform. In addition to the disclosure of Gould, the device includes mounting the hydraulics inwardly from the non-mounted end of the platform and an aperture in the non-mounted end of the platform to accommodate a truck restraining device.

Another design is disclosed in U.S. Pat. No. 6,368,043 to Leum et al. which teaches a low-profile truck leveler. In this design a low-profile leveler is enabled through the use of a raised rear beam and two lateral beams that extend above the upper surface of the platform. In addition, a central beam adds further to the leveler's strength and rigidity.

SUMMARY OF THE INVENTION

In a first embodiment of the present invention a compound truck leveler for use with a driveway includes an incline portion having a leading edge and a trailing edge wherein the trailing edge is disposed further from the driveway than the leading edge. The embodiment further includes a decline portion having a leading edge and a trailing edge wherein the leading edge of the decline portion is attached to the trailing edge of the incline portion and the leading edge of the decline portion is disposed further from the driveway than the trailing edge of the decline portion.

In a second embodiment of the present invention includes a compound truck leveler for use with a substantially flat driveway. The leveler is capable of movement between a lowered position and a raised position. In the lowered position, the leveler includes an incline portion having a leading edge at a front of the leveler and a substantially flat section wherein the substantially flat portion is inclined from the substantially flat driveway at between about 3 and 25 degrees from parallel with the substantially flat driveway. The leveler further includes a decline portion extending from the incline portion toward a rear of the leveler including a substantially flat portion wherein the substantially flat portion is declined toward the substantially flat driveway at between about 1 and 20 degrees from parallel with the substantially flat driveway. An extension portion extends from the decline portion toward a rear of the leveler and includes a substantially flat section disposed about parallel with the substantially flat driveway. A pivot apparatus allows movement of the leveler between the lowered position and the raised position.

A third embodiment of the present invention includes a compound truck leveler for use with a driveway and for elevating at least two wheels of a vehicle parked on the leveler. The compound truck leveler comprises a ramp plate for receiving and elevating the at least two wheels above the driveway. The compound truck leveler further includes a deck plate for partially lowering the at least two wheels and creating downward force when the at least two wheels remain parked on the deck plate and an extension plate for receiving the at least two wheels after descending from the deck plate.

BRIEF DESCRIPTION OF THE DRAWINGS

FIG. 4 is a cross sectional view of the incline, decline and extension portions of the compound truck leveler of FIG. 3 in the lowered position; and FIG. 5 is a cross sectional view of the compound truck leveler of FIG. 3 taken along the line V-V.

DETAILED DESCRIPTION OF PREFERRED EMBODIMENTS

Figure 1:
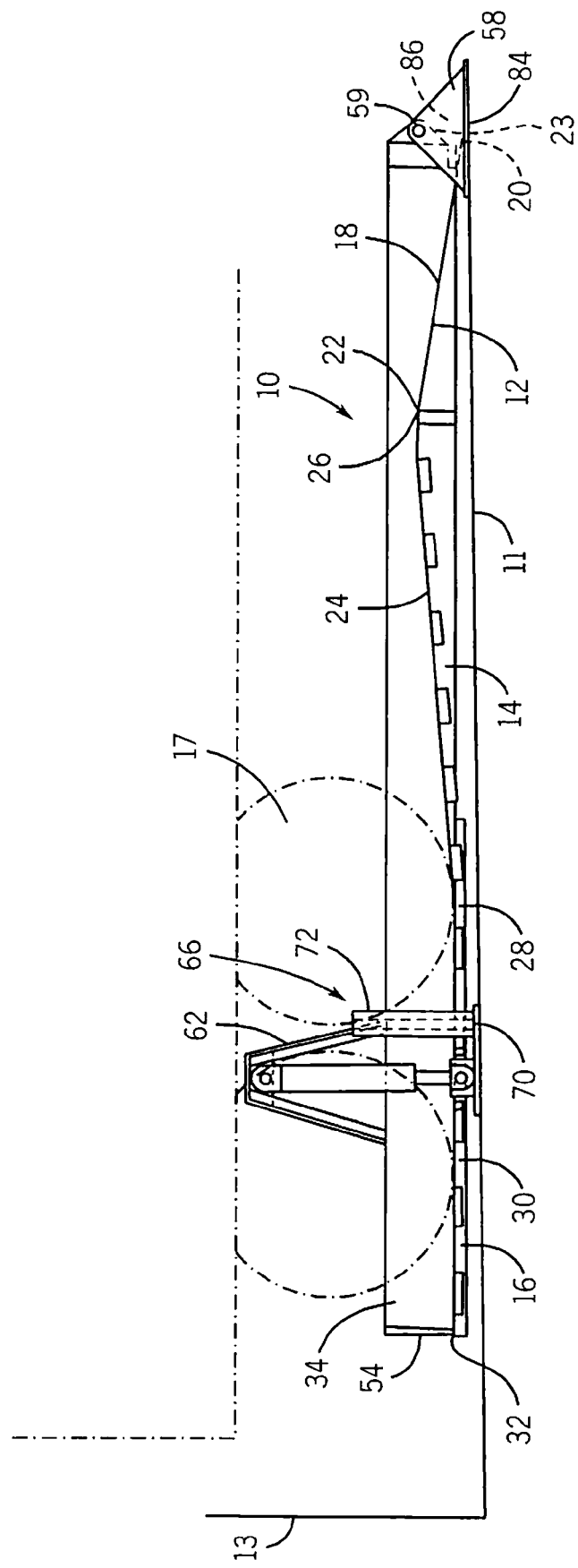
FIG. 1 is a cross sectional view of the compound truck leveler of FIG. 3 taken along the line I-I in the lowered position.

A preferred embodiment of the present invention is shown in FIGS. 1-5. The truck leveler 10, as shown in FIG. 1, includes three primary portions: an incline portion 12, a decline portion 14 and an extension portion 16 and is designed to be utilized in conjunction with a substantially flat driveway 11 near a loading dock wall 13. Furthermore, the leveler 10 can be moved between a lowered position, shown in FIG. 1; and a raised position, shown in FIG. 2.

The incline portion 12 includes a substantially flat section 18 having a front or leading edge 20 and an opposite rear or trailing edge 22. The leading edge 20 of the incline portion 12 defines the front end of the leveler 10 and is disposed close enough to the driveway 11 to allow the rear wheels 17 of a trailer to be rolled directly onto the leveler 10. Conversely, the trailing edge 22 of the incline portion 12 is elevated further above the driveway 11, whereby the incline portion 12 acts as a ramp for elevating the wheels 17 of the trailer above the driveway 11.

The decline portion 14 also includes a substantially flat portion 24 having a leading edge 26 and an opposite trailing edge 28. The leading edge 26 of the decline portion 14 is attached to the trailing edge 22 of the incline section. The use of the phrase "attached to" will be understood to mean the portions are either physically joined to one another or integral with one another. In another embodiment of the invention (not shown) the incline portion could be pivotally attached to the decline portion. The trailing edge 28 of the decline portion 14 is disposed closer to the driveway 11 than the leading edge 26 of the decline portion 14, whereby the decline portion 14 acts as a ramp for lowering the wheels of the trailer toward the driveway 11.

The extension portion 16 extends from the trailing edge 28 of the decline portion 14. The extension portion 16 includes a substantially flat portion 30 and rear edge 32 opposite the decline portion 14 and that defines the rear of the leveler 10 which is closest to the loading dock wall 13. The substantially flat portion 30 is preferably disposed in an about parallel relationship with the driveway 11 when the leveler is in the lowered position.

Figure 3:
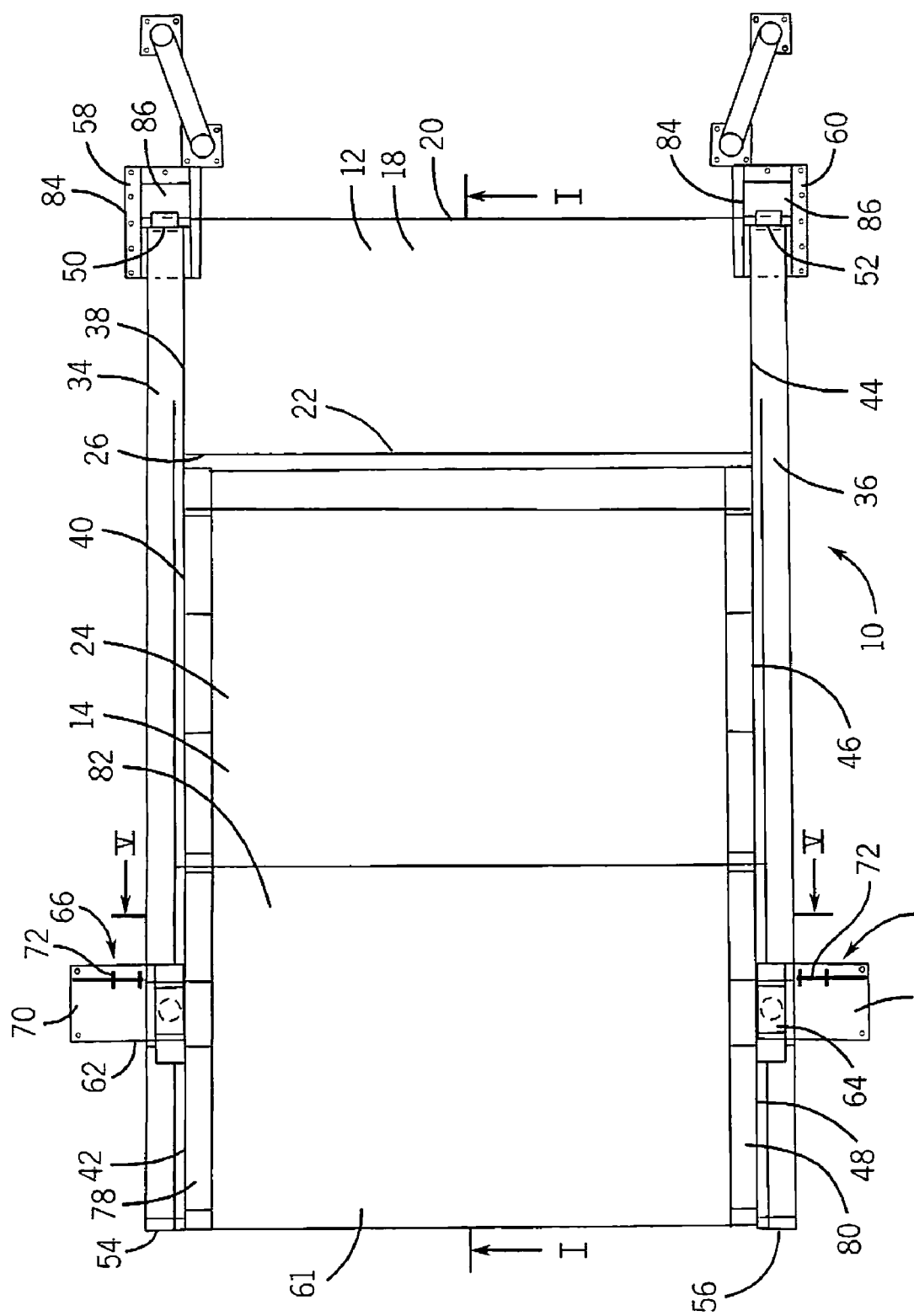
FIG. 3 is a top plan view of a preferred embodiment of a compound truck leveler.

As shown best in FIG. 3 the leveler 10 further includes first and second support members 34, 36 disposed on opposite sides of the leveler 10. The first support member 34 interconnects a first side 38 of the incline portion 12 with a first side 40 of the decline portion 14 and a first side 42 of the extension portion 16. The second support member 36 interconnects a second side 44 of the incline portion 12 with a second side 46 of the decline portion 14 and a second side 48 of the extension portion 16. The support members 34, 36 further include first ends 50, 52 near the front end of the leveler 10 and second ends 54, 56 near the rear of the leveler 10. The first ends 50, 52 are pivotally attached to the driveway 11 via pivot apparatus 23 embodied by pivot supports 58, 60, as shown in FIG. 1. In other embodiments (not shown) the incline portion could be fixed to the driveway with decline portion pivotally attached to the incline portion, thereby allowing movement of the decline and extension portions between the lowered and raised positions.

The pivot supports 58, 60 are an embodiment of an improvement in the art that can be incorporated into any leveler where one end is pivotally attached to the ground and the opposite end is lifted from the ground, thus raising a truck parked on the leveler. The improvement generally operates by creating a pivot point 59 for the leveler 10 at a point higher from the driveway than a top surface 61 of the rear of the leveler 10. Therefore, when the rear of the leveler 10 is raised from the driveway 11, the rear of the leveler 10 first moves closer to the loading dock 13 rather than further away as the leveler 10 follows the arc path (not shown) created by movement around the pivot point 59. In the current embodiment, the pivot supports 58, 60 comprise a base plate 84 and a raised section 86. The support members 34, 36 are attached to the respective pivot supports 58, 60 at the pivot point 59 at the top of the raised section 86 of each pivot support 58, 60. Therefore, since the pivot point 59 of each pivot support 58, 60 is higher than the top surface 61 of the rear of the leveler 10, pivoting of the leveler 10 causes the rear of the leveler 10 to move closer to the loading dock wall 13 until the rear of the leveler 10 passes higher than the pivot point 59 from the driveway 11.

A lifting system is also incorporated into the leveler 10 in the form of hydraulic lifts 62, 64 integral with the respective support member 34, 35 and attached to the driveway 11. The hydraulic lifts 62, 64 lift the rear end of the leveler 10 while the front end pivots via the pivot supports 58, 60. However, any other lifting systems known in the art could be utilized as well.

The leveler 10 also includes lateral load braces 66, 68 adjacent each support member 34, 36. The lateral load braces are an embodiment of an improvement in the art and can be incorporated into any dock leveler. The improvement consists of a separate support structure, that the leveler, when it is under the load of a vehicle, comes into contact with. That support structure thereby resists any lateral movement of the leveler and accepts some of the transferred weight load from the leveler, thereby reducing the strain on the lifting system. In the current embodiment, the lateral load braces 66, 68 each include a support base 70 and a vertical support 72. The load braces 66, 68 contact the support member 34, 36 and resist lateral movement by the support member 34, 36 when under weight from a trailer.

The relationship between the incline portion 12 and the driveway 11 and the decline portion 14 and the driveway 11 can also be defined in terms of angles as shown in FIG. 4 where the leveler 10 is shown in the lowered position. The incline portion 12 is disposed such that the angle 74 between the substantially flat section 18 of the incline portion 12 and the driveway 11 is about 10 degrees. The decline portion 14 is disposed such that the angle 76 between the substantially flat section 24 of the decline portion 14 and the driveway 11 is about 6 degrees.

The leveler 10 may also include wheel guides 78, 80, shown in FIG. 5 and disposed adjacent the support members 34, 36 on an upper surface 82 of the extension portion 16. The wheel guides 78, 80 act to guide the wheels of the trailer and transfer the weight load to the support members 34, 36 and therefore the lateral load braces 66, 68.

In operation, a trailer is backed up to put the wheels onto the incline portion or ramp plate 12. The wheels and trailer are therefore elevated from the driveway 11. As the trailer is further backed onto the leveler 10 the wheels pass onto the decline portion or deck plate 14 and begin to be lowered back toward the driveway 11. At this point one of two things may occur. First, the trailer may have backed up to the loading dock wall 13 and the trailer may be parked with one or more of the wheels still on the decline portion. In such a scenario the angle 76 of the decline portion 12 causes the trailer to be pressed toward the loading dock wall 13 thereby minimizing the likelihood of the trailer rolling away from the wall 13. At that point the lifting system may be operated to lift the trailer to the proper height. By having the decline in the leveler 10 when the rear of the leveler 10 is lifted the wheels that were on the decline portion 14 are only moved into a less declined angle or possibly a parallel angle with the driveway 11 during the short movements required to raise the trailer to the appropriate level.

Figure 2:
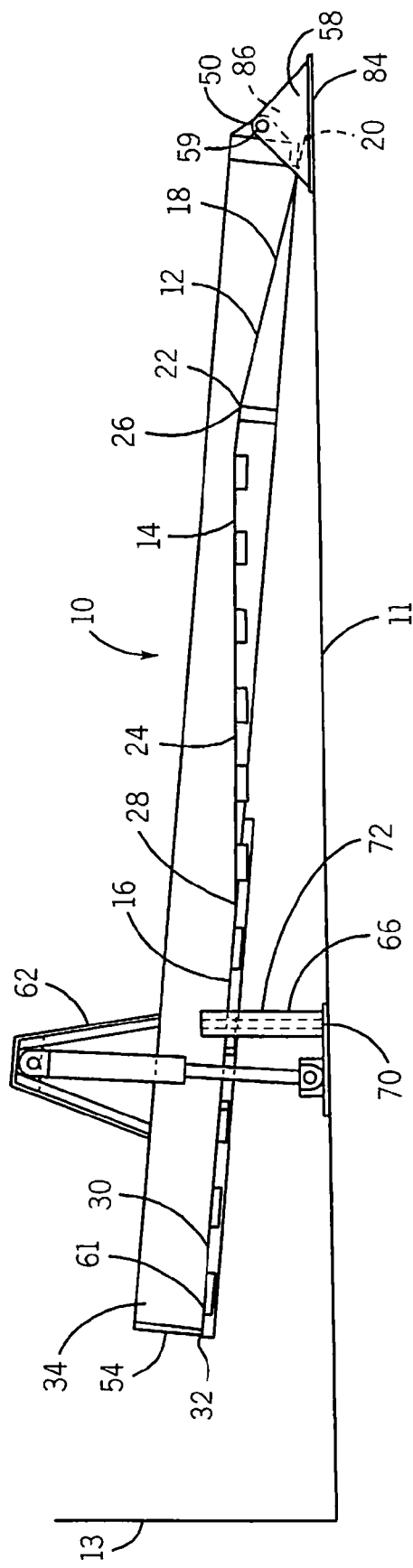
FIG. 2 is a cross sectional view of the compound truck leveler of FIG. 3 taken along the line I-I in the raised position.

In the second scenario the wheels of the trailer are backed up completely off of the decline portion 14 and onto the extension portion 16. As shown in FIG. 2 when the leveler 10 is in the raised position the wheels would be decline away from the wall 13 as in a standard leveler previously known in the art. However, in such a scenario the wheels would still have to overcome the flat, or still declined depending on the amount of the raise, decline portion 14 therefore still creating a safer environment with less of a chance of a roll-off. In either of the above scenarios an embodiment of the current invention allows the trailer to have improved safety in the dock, by reducing the tendency of the trailer to roll forward or off of the leveler when the leveler is raised.

As the trailer is backed onto the extension portion the wheels are guided by the wheel guides 78, 80 to center the trailer properly on the leveler 10. Once the trailer is parked, and the leveler 10 raised, the wheels will remain in contact with the wheel guides 78, 80 and the weight of the trailer is therefore partially transferred to the support members 34, 36.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

I claim:

1. A compound truck leveler for use upon a driveway adjacent to a loading dock, the leveler comprising:

an incline portion having a leading edge defining a front of the leveler and a trailing edge, wherein the trailing edge is disposed further from the driveway than the leading edge;

a decline portion extending from the incline portion toward the loading dock and having a leading edge and a trailing edge, wherein the leading edge of the decline portion is rigidly attached to the trailing edge of the incline portion to prohibit movement of the decline portion independent of the incline portion, and the leading edge of the decline portion is disposed further from the driveway than the trailing edge of the decline portion;

an extension portion extending from the decline portion towards a rear of the leveler and including a substantially flat surface being disposed substantially parallel to the driveway, the extension portion having a leading edge and a trailing edge, the leading edge is rigidly attached to the trailing edge of the decline portion to prohibit movement of the extension portion independent of the decline portion, the extension portion extending towards the loading dock; and a pivot apparatus rigidly attached to the driveway adjacent to a front of the leveler and including at least two pivot supports, the incline portion being pivotally attached to the pivot apparatus;

wherein the leveler is able to support the weight of a truck and is limited only to rotational movement about the pivot apparatus between a lowered position and a raised position; wherein the trailing edge of the extension portion is a rear edge defining the rear of the leveler and each of the pivot supports includes a pivot point, the pivot point being disposed further from the driveway than the rear of the leveler in the lowered position.

2. The compound truck leveler of claim 1 further comprising:

a first support member interconnecting a first side of the incline portion with a first side of the decline portion and a first side of the extension portion; and a second support member interconnecting a second side of the incline portion with a second side of the decline portion and a second side of the extension portion.

3. The compound truck leveler of claim 2 wherein the at least two pivot supports include a first end of each of the first and second support members which is pivotally attached to the driveway via the corresponding pivot support.

4. The compound truck leveler of claim 3 further including a lifting system for lifting the leveler while the first ends of the support members remain pivotally attached to the driveway.

5. The compound truck leveler of claim 4 further including first and second lateral load braces adjacent to first and second support members respectively, each lateral load brace being mounted to the driveway for restraining lateral movement of the leveler.

6. The compound truck leveler of claim 1 wherein the incline, decline and extension portions have top surfaces integrally extending from the leading edge of the incline portion to the trailing edge of the extension portion, each top surface being unitary and substantially flat.

7. A compound truck leveler for use upon a substantially flat driveway adjacent to a loading dock, the leveler being able to support the weight of a truck and being adapted to only pivotally move between a lowered position and a raised position, the leveler in the lowered position comprising:

an incline portion having a leading edge at a front of the leveler and a substantially flat surface, wherein the surface is inclined above the driveway between about 3 and 25 degrees from parallel with the driveway;

a decline portion rigidly attached to the incline portion, extending from the incline portion towards the loading dock and including a substantially flat surface, wherein the surface is declined toward the driveway between about 1 and 20 degrees from parallel with the driveway;

an extension portion rigidly attached to the decline portion, extending from the decline portion towards a rear of the leveler and including a substantially flat surface, wherein the surface is disposed substantially parallel to the driveway, the extension portion having a leading edge and a trailing edge, the leading edge is rigidly attached to the trailing edge of the decline portion to prohibit movement of the extension portion independent of the decline portion, the extension portion extending towards the loading dock; and a pivot apparatus rigidly attached to the driveway adjacent to the front and including at least two pivot supports, the incline portion being pivotally attached to the pivot apparatus so that the leveler is only allowed to rotate at the pivot apparatus for movement between the lowered position and the raised position wherein the trailing edge of the extension portion is a rear edge defining the rear of the leveler and each of the pivot supports includes a pivot point, the pivot point being disposed further from the driveway than the rear of the leveler in the lowered position.

8. The compound truck leveler of claim 7 wherein the surface of the decline portion is substantially parallel with respect to the driveway when the leveler is in the raised position.

9. The compound truck leveler of claim 8 further including a lifting system for rotating the leveler from the lowered position to the raised position.

10. The compound truck leveler of claim 9 wherein the angle of the surface of the incline portion is between about 8 to 12 degrees from parallel with the driveway and the angle of the surface of the decline portion is between about 4 to 8 degrees from parallel with the driveway.

11. The compound truck leveler of claim 7 wherein the surface of the extension portion is no more than about 2 inches above the driveway in the lowered position.

* * * * *